(12) United States Patent
Mita

(10) Patent No.: US 11,465,448 B2
(45) Date of Patent: Oct. 11, 2022

(54) PNEUMATIC TIRE

(71) Applicant: The Yokohama Rubber Co., LTD., Tokyo (JP)

(72) Inventor: Masaya Mita, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 143 days.

(21) Appl. No.: 16/319,245

(22) PCT Filed: Jul. 18, 2017

(86) PCT No.: PCT/JP2017/025917
§ 371 (c)(1),
(2) Date: Jan. 18, 2019

(87) PCT Pub. No.: WO2018/016477
PCT Pub. Date: Jan. 25, 2018

(65) Prior Publication Data
US 2019/0275842 A1    Sep. 12, 2019

(30) Foreign Application Priority Data

Jul. 19, 2016    (JP) .............................. JP2016-141223

(51) Int. Cl.
*B60C 11/12*    (2006.01)
*B60C 11/03*    (2006.01)
*B60C 11/13*    (2006.01)

(52) U.S. Cl.
CPC .......... *B60C 11/0304* (2013.01); *B60C 11/03* (2013.01); *B60C 11/0302* (2013.01);
(Continued)

(58) Field of Classification Search
CPC . B60C 11/0304; B60C 11/03; B60C 11/0302; B60C 11/12; B60C 11/1236;
(Continued)

(56) References Cited

U.S. PATENT DOCUMENTS 8,925,598 B2 * 1/2015 Ebiko ................. B60C 11/1315
152/209.14
9,346,322 B2 * 5/2016 Nishiwaki ............... B60C 11/12
(Continued)

FOREIGN PATENT DOCUMENTS

| JP | H07-040712 | 2/1995 |
| JP | 2000-158916 | 6/2000 |

(Continued)

OTHER PUBLICATIONS

International Search Report for International Application No. PCT/JP2017/025917 dated Aug. 29, 2017, 4 pages, Japan.

*Primary Examiner* — Matthew J Daniels
*Assistant Examiner* — Shibin Liang
(74) *Attorney, Agent, or Firm* — Thorpe North & Western

(57) ABSTRACT

A tread pattern of a pneumatic tire includes an inner circumferential main groove and an outer circumferential main groove that have groove walls extending in a tire circumferential direction while the angle of the groove walls relative to a contact surface varies with a predetermined amplitude, an inner lug groove extending from the inner circumferential main groove toward the outer circumferential main groove, an outer lug groove extending from the outer circumferential main groove toward the inner circumferential main groove, and a sipe configured to communicate the inner lug groove with the outer lug groove. A pair of chamfered surfaces are provided on walls of the sipe along an extension direction of the sipe on the contact surface.

19 Claims, 6 Drawing Sheets

(52) U.S. Cl.
 CPC .......... *B60C 11/12* (2013.01); *B60C 11/1236* (2013.01); *B60C 11/13* (2013.01); *B60C 11/1323* (2013.01); *B60C 2011/0346* (2013.01); *B60C 2011/0358* (2013.01)

(58) Field of Classification Search
 CPC ................ B60C 11/13; B60C 11/1323; B60C 2011/0346; B60C 2011/0358; B60C 11/11
 See application file for complete search history.

(56) References Cited

U.S. PATENT DOCUMENTS

| | | | |
|---|---|---|---|
| 9,415,637 B2* | 8/2016 | Kobayashi | .......... B60C 11/0316 |
| 2010/0096055 A1 | 4/2010 | Shibano | |
| 2013/0160909 A1 | 6/2013 | Atake | |
| 2015/0151584 A1* | 6/2015 | Koishikawa | .......... B60C 11/125 |
| | | | 152/209.18 |
| 2015/0165825 A1 | 6/2015 | Kobayashi | |

FOREIGN PATENT DOCUMENTS

| | | |
|---|---|---|
| JP | 2004-203269 | 7/2004 |
| JP | 2010-095196 | 4/2010 |
| JP | 2013-132966 | 7/2013 |
| JP | 2014-040184 | 3/2014 |
| JP | 2014-076764 | 5/2014 |
| JP | 2015-134581 | 7/2015 |
| WO | WO 2014/030476 | 2/2014 |
| WO | WO 2014/030503 | 2/2014 |

* cited by examiner

PNEUMATIC TIRE

TECHNICAL FIELD

The present technology relates to a pneumatic tire provided with a tread pattern.

BACKGROUND ART

A conventional pneumatic tire is known that is equipped with a plurality of circumferential main grooves extending in the tire circumferential direction, and land portions formed between two circumferential main grooves adjacent to each other in the tire lateral direction. The region of land portions has a plurality of lug grooves or sipes disposed in the tire circumferential direction, and the lug grooves or sipes communicate with the circumferential main grooves on both sides of the land portions (see Japan Unexamined Patent Publication No. H7-40712). According to the tire of Japan Unexamined Patent Publication No. H7-40712, it is alleged that noise can be reduced while maintaining wet performance.

In the tire of Japan Unexamined Patent Publication No. H7-40712, however, since the width of the circumferential main groove varies depending on the position in the tire circumferential direction, the drainage performance also varies depending on the position in the tire circumferential direction, and the overall wet performance may decrease.

SUMMARY

The present technology provides a pneumatic tire having excellent wet performance while running.

One aspect of the present technology relates to a pneumatic tire having a tread pattern that includes: an inner circumferential main groove having groove walls each extending in a tire circumferential direction while angles of the groove walls with respect to a contact surface vary with a predetermined amplitude; an outer circumferential main groove having groove walls each extending in a tire circumferential direction while angles of the groove walls with respect to a contact surface vary with a predetermined amplitude on one side of a tire width direction relative to the inner circumferential main groove; an inner lug groove extending, from the inner circumferential main groove toward the outer circumferential main groove, partway along a region of a land portion between the inner circumferential main groove and the outer circumferential main groove; an outer lug groove extending, from the outer circumferential main groove toward the inner circumferential main groove, partway along a region of a land portion between the inner circumferential main groove and the outer circumferential main groove; and a sipe configured to communicate an end portion of an outer circumferential main groove side of the inner lug groove with an end portion of an inner circumferential main groove side of the outer lug groove, wherein a width of the sipe expands toward a tread surface due to a pair of chamfered surfaces provided on walls of the sipe along an extension direction of the sipe on the contact surface.

It is preferable for an interval between a pair of ridge lines formed by the chamfered surfaces and a contact surface to be equal to a groove width of the inner lug groove and a groove width of the outer lug groove.

It is preferable for a center position in a width direction of the sipe to coincide with a center position in a groove width direction of the inner lug groove and the outer lug groove, at a connection portion of the sipe with the inner lug groove and the outer lug groove.

It is preferable for the inner lug groove to extend from a location where an angle formed by a groove wall on the outer circumferential main groove side of the inner circumferential main groove and the contact surface is greater than an average value of a maximum value and a minimum value of the angle formed by the groove wall on the outer circumferential main groove side of the inner circumferential main groove and the contact surface; and for the outer lug groove to extend from a location where an angle formed by a groove wall on the inner circumferential main groove side of the outer circumferential main groove and the contact surface is greater than an average value of a maximum value and a minimum value of the angle formed by the groove wall on the inner circumferential main groove side of the outer circumferential main groove and the contact surface.

It is preferable for the inner lug groove to extend from a location where an angle formed by a groove wall on the outer circumferential main groove side of the inner circumferential main groove and the contact surface is smaller than an average value of a maximum value and a minimum value of the angle formed by the groove wall on the outer circumferential main groove side of the inner circumferential main groove and the contact surface; and for the outer lug groove to extend from a location where an angle formed by a groove wall on the inner circumferential main groove side of the outer circumferential main groove and the contact surface is smaller than an average value of a maximum value and a minimum value of the angle formed by the groove wall on the inner circumferential main groove side of the outer circumferential main groove and the contact surface.

Another aspect of the present technology relates to a pneumatic tire having a tread pattern that includes: an inner circumferential main groove having groove walls each extending in a tire circumferential direction while angles of the groove walls with respect to a contact surface vary with a predetermined amplitude; a first outer circumferential main groove having groove walls each extending in a tire circumferential direction while angles of the groove walls with respect to a contact surface vary with a predetermined amplitude on a first side in a tire width direction relative to the inner circumferential main groove; a first inner lug groove extending, from the inner circumferential main groove toward the first outer circumferential main groove, partway along a region of a land portion between the inner circumferential main groove and the first outer circumferential main groove; a first outer lug groove extending, from the first outer circumferential main groove toward the inner circumferential main groove, partway along a region of a land portion between the inner circumferential main groove and the first outer circumferential main groove; a first sipe configured to communicate an end portion of a first outer circumferential main groove side of the first inner lug groove with an end portion of an inner circumferential main groove side of the first outer lug groove; a second outer circumferential main groove having groove walls each extending in a tire circumferential direction while angles of the groove walls with respect to a contact surface vary with a predetermined amplitude on a second side opposite to a first side in a tire width direction relative to the inner circumferential main groove; a second inner lug groove extending, from the inner circumferential main groove toward the second outer circumferential main groove, partway along a region of a land portion between the inner circumferential main groove and the second outer circumferential main groove; a second outer lug groove extending, from the second outer circumferential main groove toward the inner circumferential main groove, partway along a region of a land portion between the inner circumferential main groove and the second outer circumferential main groove; and a second sipe configured to communicate an end portion of a second outer circumferential main groove side of the second inner lug groove with an end portion of an inner circumferential main groove side of the second outer lug groove; wherein a width of the first sipe expands toward a tread surface due to a pair of first chamfered surfaces provided on walls of the first sipe along an extension direction of the first sipe on the contact surface, and a width of the second sipe expands toward a tread surface due to a pair of second chamfered surfaces provided on walls of the second sipe along an extension direction of the second sipe on the contact surface.

It is preferable for a mounting direction of the pneumatic tire with respect to a vehicle to be determined in advance; the pneumatic tire to be mounted such that the first side is on a vehicle inner side; the first inner lug groove to extend from a location where an angle formed by a groove wall on the first side of the inner circumferential main groove and the contact surface is greater than an average value of a maximum value and a minimum value of the angle formed by the groove wall on the first side of the inner circumferential main groove and the contact surface; and the first outer lug groove to extend from a location where an angle formed by a groove wall on the second side of the first outer circumferential main groove and the contact surface is greater than an average value of a maximum value and a minimum value of the angle formed by the groove wall on the second side of the first outer circumferential main groove and the contact surface.

It is preferable for a mounting direction of the pneumatic tire with respect to a vehicle to be determined in advance; the pneumatic tire to be mounted such that the second side is on a vehicle outer side; the second inner lug groove to extend from a location where an angle formed by a groove wall on the second side of the inner circumferential main groove and the contact surface is smaller than an average value of a maximum value and a minimum value of the angle formed by the groove wall on the second side of the inner circumferential main groove and the contact surface; and the second outer lug groove to extend from a location where an angle formed by a groove wall on the first side of the second outer circumferential main groove and the contact surface is smaller than an average value of a maximum value and a minimum value of the angle formed by the groove wall on the first side of the second outer circumferential main groove and the contact surface.

When a length of the first outer lug groove is denoted as LA and a length of the first inner lug groove is denoted as LB, it is preferable that $1.8 \leq LA/LB \leq 2.2$.

When a length of the second inner lug groove is denoted as LC and a length of the second outer lug groove is denoted as LD, it is preferable that $1.0 < LC/LD \leq 1.2$.

It is preferable for an interval between a pair of ridge lines formed by the first chamfered surfaces and a contact surface to be equal to a groove width of the first inner lug groove and a groove width of the first outer lug groove.

It is preferable for an interval between a pair of ridge lines formed by the second chamfered surfaces and a contact surface to be equal to a groove width of the second inner lug groove and a groove width of the second outer lug groove.

According to the present technology, a pneumatic tire having excellent wet performance can be obtained.

DETAILED DESCRIPTION

Hereinafter, a pneumatic tire according to the embodiments of the present technology will be described in detail.

Figure 1:
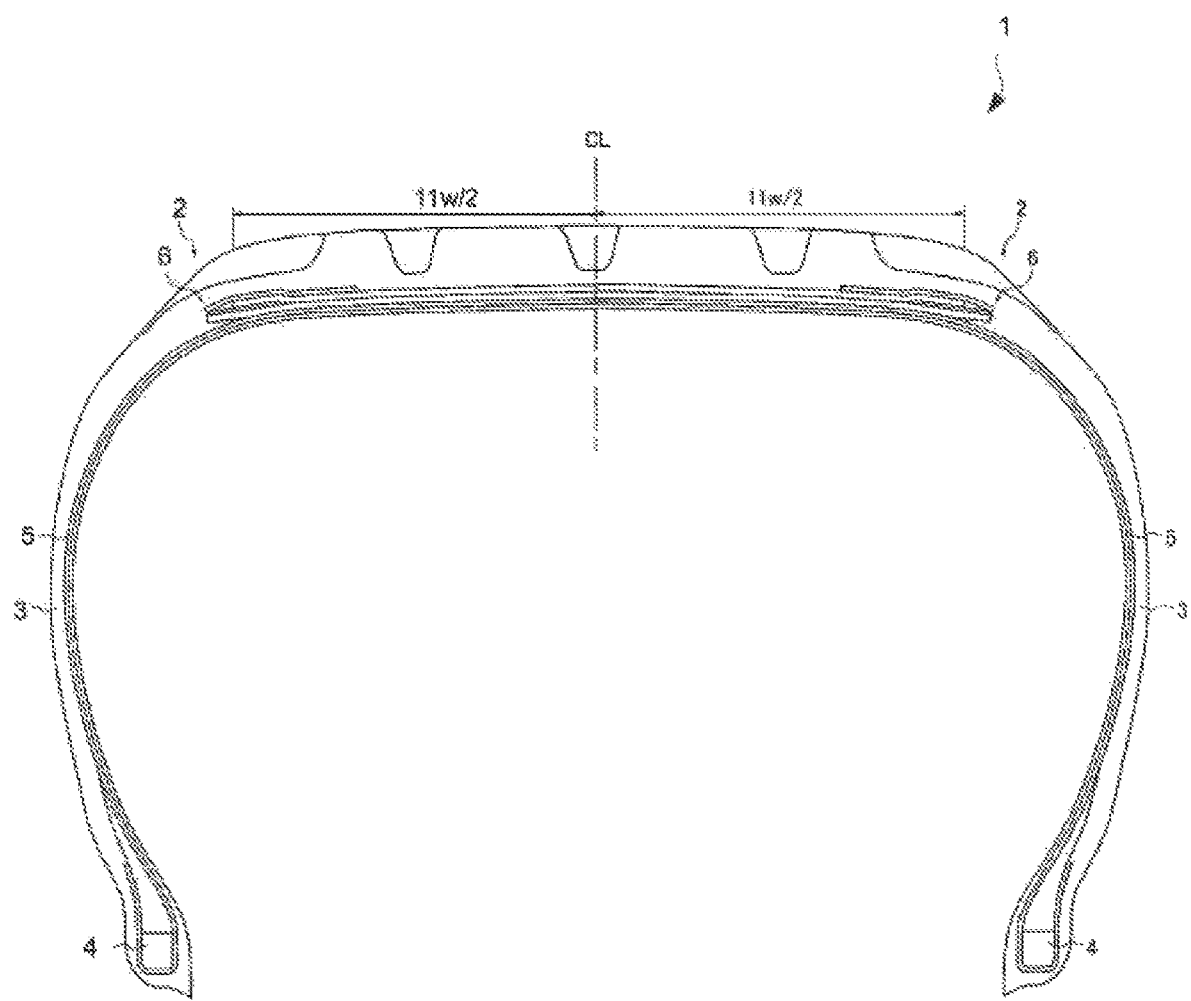
FIG. 1 is a cross-sectional view of a tire according to an embodiment of the present technology.

FIG. 1 illustrates a cross-sectional view of a pneumatic tire 1 of the present embodiment.

The pneumatic tire (hereinafter, referred to as a tire) 1 is a tire for a passenger vehicle.

Known configurations can be used for the structure and the rubber members of the tire 1.

As illustrated in FIG. 1, the tire 1 includes a tread portion 2, a sidewall 3, a bead 4, a carcass layer 5, and a belt layer 6. Although not illustrated, the tire 1 may also include an innerliner layer or the like. The sidewall 3 and the bead 4 are each formed as pairs that are disposed on both sides in the tire lateral direction so as to sandwich the tread portion 2.

Known configurations can be used for the tread portion 2, the bead 4, the belt layer 6, the innerliner layer, and the like.

Figure 2:
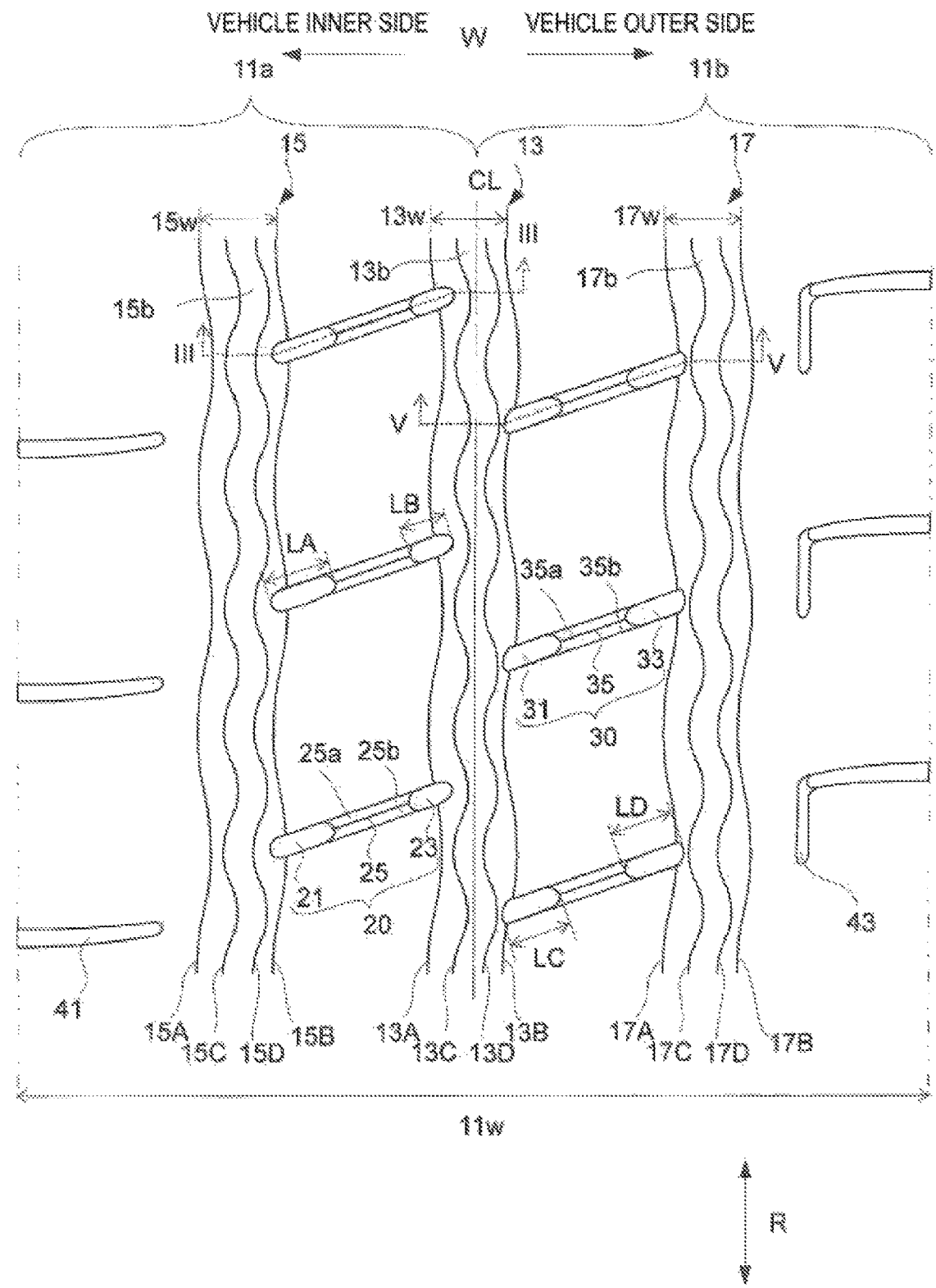
FIG. 2 is a developed plan view illustrating between the ground contact edges of an example of a tread pattern of the tire illustrated in FIG. 1.

As illustrated in FIG. 2, in the tire 1 of the present embodiment, a tread pattern 10 that represents a feature of the present embodiment is formed in the tread portion 2. FIG. 2 is a developed plan view illustrating between the ground contact edges of the tread pattern 10 of the tire 1 of the present embodiment. The tire 1 having the tread pattern 10 may be suitably used as a tire for a passenger vehicle.

In the tire 1 of the present embodiment, the mounting direction of the tire to be mounted facing the vehicle outer side is determined in advance. For example, the mounting direction of the tire may be displayed as information such as marks, letters, or the like indicating the vehicle outer side or the vehicle inner side on the surface of the sidewall 3, so that the tire 1 is mounted on the vehicle in accordance with this display. In FIG. 2, the reference sign CL denotes a tire equator line, and the region of the tread pattern 10 on the left side (the first side) of the paper surface of FIG. 2 from the tire equator line CL indicates a half-tread region 11a mounted on the vehicle inner side. The region of the tread pattern 10 on the right side (the second side) of the paper surface of FIG. 2 from the tire equator line CL indicates a half-tread region 11b mounted on the vehicle outer side. In the following explanation, in the tire lateral direction, the direction on the inner side of the vehicle when the tire 1 is mounted on the vehicle is referred as the vehicle inner side, and the direction on the outer side of the vehicle is referred to as the vehicle outer side.

In a state in which the tire 1 is mounted on the vehicle, the tread pattern 10 comes into contact with the road surface in a region indicated by a ground contact width 11w illustrated in FIG. 2.

Here, the ground contact width 11w is the width of the ground contact surface in the tire lateral direction when the tire 1 is brought into contact with a horizontal surface under the conditions that the tire 1 is mounted on a regular rim, inflated to a regular internal pressure of 180 kPa, and loaded with a load that is 88% of the regular load. Here, the "regular rim" refers to an "applicable rim" defined by JATMA (Japan Automobile Tyre Manufacturers Association, Inc.), a "Design Rim" defined by TRA (The Tire and Rim Association, Inc.), or a "Measuring Rim" defined by ETRTO (The European Tyre and Rim Technical Organisation). In addition, the "regular internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO. "Regular internal pressure" is, for example, 180 kPa for a tire on a passenger vehicle. Additionally, "regular load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

In the present embodiment, the "tire lateral direction W" refers to the direction of the rotation center axis of the tire 1, and the "tire circumferential direction R" refers to the rotation direction of the tread surface when the tire 1 is rotated about the tire rotational center axis. The above directions are illustrated in FIG. 2.

The tread pattern 10 includes a wave-shaped circumferential main groove group, a lug groove/sipe assembly group, and shoulder lug grooves 41, 43 or the like.

(Wave-Shaped Circumferential Main Groove Group)

The wave-shaped circumferential main groove group includes an inner circumferential main groove 13, an outer circumferential main groove 15 (a first outer circumferential main groove), and an outer circumferential main groove 17 (a second outer circumferential main groove). The inner circumferential main groove 13 and the outer circumferential main grooves 15, 17 extend annularly in the tire circumferential direction, respectively.

The inner circumferential main groove 13 is provided along the tire equator line CL, and is shared by both of the half-tread regions 11a and 11b. The outer circumferential main groove 15 is positioned away from the inner circumferential main groove 13 toward the vehicle inner side in the tire lateral direction. The outer circumferential main groove 17 is positioned away from the inner circumferential main groove 13 toward the vehicle outer side in the tire lateral direction.

The inner circumferential main groove 13 and the outer circumferential main grooves 15, 17 each have two groove walls, and two edges extending in the tire circumferential direction are respectively formed due to these two groove walls intersecting with the contact surface. The edge on the vehicle inner side of the inner circumferential main groove 13 is denoted as 13A and the edge on the vehicle outer side is denoted as 13B, the edge on the vehicle inner side of the outer circumferential main groove 15 is denoted as 15A and the edge on the vehicle outer side is denoted as 15B, and the edge on the vehicle inner side of the outer circumferential main groove 17 is denoted as 17A and the edge on the vehicle outer side is denoted as 17B. The positions in the tire lateral direction of the edges 13A, 13B, 15A, 15B, 17A, and 17B vary with a predetermined amplitude depending on the position of the tire circumferential direction, and the edges 13A, 13B, 15A, 15B, 17A, and 17B extend in a waveform shape in the tire circumferential direction. Accordingly, the lengths of the edges 13A, 13B, 15A, 15B, 17A, and 17B are made longer than the straight-shaped circumferential main groove extending linearly in the tire circumferential direction, and the wet performance improves due to the increase in the edges.

In contrast, each of the inner circumferential main groove 13 and the outer circumferential main grooves 15, 17 has constant groove widths 13w, 15w, and 17w in the tire lateral direction, respectively. Accordingly, drainage performance can be improved in comparison with cases where the groove width varies. Here, the groove width 13w is an interval in the tire lateral direction of the edges 13A and 13B, the groove width 15w is an interval in the tire lateral direction of the edges 15A and 15B, and the groove width 17w is an interval in the tire lateral direction of the edges 17A and 17B. It should be noted that the groove widths 13w, 15w, and 17w may be equal to each other or may be different from each other.

The sum of the respective groove widths 13w, 15w, and 17w is preferably from 20% to 35% of the ground contact width 11w. By means of the sum of the groove widths 13w, 15w, and 17w being greater than or equal to 20% of the ground contact width 11w, sufficient drainage performance is obtained and the wet performance improves. In addition, by means of the sum of the groove widths 13w, 15w, and 17w being less than or equal to 35% of the ground contact width 11w, a decrease in the width of the land portion between the inner circumferential main groove 13 and the outer circumferential main grooves 15 and 17 can be suppressed, and the rigidity of the land portion can be secured within an appropriate range.

The inner circumferential main groove 13 and the outer circumferential main grooves 15, 17 are grooves recessed inward in the tire radial direction from the contact surface of the tread portion 2, and each have bottom portions 13b, 15b, and 17b, respectively. The bottom portions 13b, 15b, and 17b each have a constant width that is narrower than the groove widths 13w, 15w, and 17w in the tire lateral direction. Here, the width of the bottom portion 13b is defined as the interval in the tire lateral direction between a pair of valley lines formed by the intersection of the pair of groove walls of the inner circumferential main groove 13 and the bottom surface of the inner circumferential main groove 13. In addition, the width of the bottom portion 15b is defined as the interval in the tire lateral direction between a pair of valley lines formed by the intersection of the pair of groove walls of the outer circumferential main groove 15 and the bottom surface of the outer circumferential main groove 15, and the width of the bottom portion 17b is defined as the interval in the tire lateral direction between a pair of valley lines formed by the intersection of the pair of groove walls of the outer circumferential main groove 17 and the bottom surface of the outer circumferential main groove 17. The valley line on the vehicle inner side of the bottom portion 13b is denoted as 13C and the valley line on the vehicle outer side is denoted as 13D, the valley line on the vehicle inner side of the bottom portion 15b is denoted as 15C and the valley line on the vehicle outer side is denoted as 15D, and the valley line on the vehicle inner side of the bottom portion 17b is denoted as 17C and the valley line on the vehicle outer side is denoted as 17D. The valley lines 13C, 13D, 15C, 15D, 17C, and 17D extend in a wave-like shape in the tire circumferential direction as the position in the tire lateral direction varies with a predetermined amplitude according to the position in the tire circumferential direction. It should be noted that the wave-like wavelengths of the valley lines 13C, 13D, 15C, 15D, 17C and 17D are shorter than the wave-like wavelengths of the edges 13A, 13B, 15A, 15B, 17A and 17B. Accordingly, the groove walls of the inner circumferential main groove 13 and the outer circumferential main grooves 15, 17 include a rotational center axis, and are inclined in a linear or a curved shape in the groove cross-sectional shapes of the inner circumferential main groove 13 and the outer circumferential main grooves 15, 17 that are cut in a plane along the tire lateral direction orthogonal to the tire lateral direction W and the tire circumferential direction R. The inclination of the groove walls is formed to vary at the same position in the groove depth direction with a predetermined amplitude according to the position in the tire circumferential direction.

In the groove walls of the inner circumferential main groove 13 and the outer circumferential main grooves 15, 17, the intersection formed by these groove walls and a plane in contact with the contact surface at the edges 13A, 13B, 15A, 15B, 17A, and 17B is formed in a wave-like shape that varies with a predetermined amplitude in the tire lateral direction depending on the position of the tire circumferential direction. The groove walls of the inner circumferential main groove 13 and the outer circumferential main grooves 15, 17 may be formed such that the wavelength of the wave-like shape becomes shorter toward the inner side of the tire radial direction from the contact surface. Accordingly, as the wear of the tire 1 progresses, the total length of the edge becomes longer, and the edge effect increases as the wear of the tire 1 progresses. In this way, the decrease in wet performance at the time of abrasion can be suppressed.

It should be noted that the wavelength and the amplitude of the wave-like shapes of the edges 13A, 13B, 15A, 15B, 17A, and 17B may be equal to each other, or may be different from each other. In the case that the wavelengths of the wave-like shapes of the edges 13A, 13B, 15A, 15B, 17A, and 17B are equal to each other, although it is preferable that there be no difference in phase of the wave-like shapes at the same position in the tire circumferential direction, a difference in phase may be allowed. In the case that the wavelengths and the amplitudes of the wave-like shapes of the edges 13A, 13B, 15A, 15B, 17A and 17B are equal to each other and there is no difference in the phase of the wave-like shapes at the same position in the tire circumferential direction, the width of the inner land portion between the inner circumferential main groove 13 and the outer circumferential main groove 15 and the width of the inner land portion between the inner circumferential main groove 13 and the outer circumferential main groove 17 can be made constant, regardless of the position in the tire circumferential direction. Accordingly, uneven wear can be suppressed.

The wavelength and amplitude of the wave-like shapes of the valley lines 13C, 13D, 15C, 15D, 17C, and 17D may be equal to each other, or may be different from each other. In the case that the wavelengths of the wave-like shapes of the edges 13A, 13B, 15A, 15B, 17A and 17B are equal to each other and the wavelengths of the wave-like shapes of the valley lines 13C, 13D, 15C, 15D, 17C and 17D are equal to each other, the phases of the edges of the inner circumferential main groove 13 and the outer circumferential main grooves 15, 17 can be aligned as the wear of the tire progresses.

It should be noted that, in FIG. 2, the wavelengths of the valley lines 13C, 13D, 15C, 15D, 17C, and 17D are half the wavelengths of the edges 13A, 13B, 15A, 15B, 17A, and 17B, respectively, but wavelengths less than half or longer wavelengths are also possible.

In addition, only one of the circumferential main grooves of the wave-shaped circumferential main groove group may have a valley line with a wavelength shorter than the wavelengths of the edges. In addition, any of the circumferential main grooves of the wave-shaped circumferential main groove group may have a valley line with a wavelength greater than or equal to the wavelengths of the edges.

Further, although not illustrated in FIG. 2, from the perspective of increasing ground contact pressure and enhancing the wet performance, chamfering may be applied to the edges 13A, 13B, 15A, 15B, 17A and 17B. It should be noted that, in the case that chamfering is performed, the groove width is the interval in the tire lateral direction between two intersection lines of two extended planes, which extend the two groove walls of the circumferential main groove outward in the tire radial direction, and the contact surface.

Lug Groove/Sipe Assembly Group

The lug groove/sipe assembly group includes a plurality of lug groove/sipe assemblies 20 provided between the inner circumferential main groove 13 and the outer circumferential main groove 15 at spaced intervals in the tire circumferential direction and a plurality of lug groove/sipe assemblies 30 provided between the inner circumferential main groove 13 and the outer circumferential main groove 17 at spaced intervals in the tire circumferential direction.

The plurality of lug groove/sipe assemblies 20 are provided so as to connect the groove wall on the vehicle inner side of the inner circumferential main groove 13 and the groove wall on the vehicle outer side of the outer circumferential main groove 15. Each of the lug groove/sipe assemblies 20 is provided with lug grooves 21 (the first outer lug groove) at both ends, a lug groove 23 (the first inner lug groove), and a sipe 25 (the first sipe) at the central portion.

In the present embodiment, the "lug groove" refers to a groove having a groove width of greater than or equal to 1.5 mm and a groove depth greater than or equal to 5 mm. Further, in the present embodiment, the "sipe" refers to a sipe with a width of less than 1.5 mm.

Figure 3:
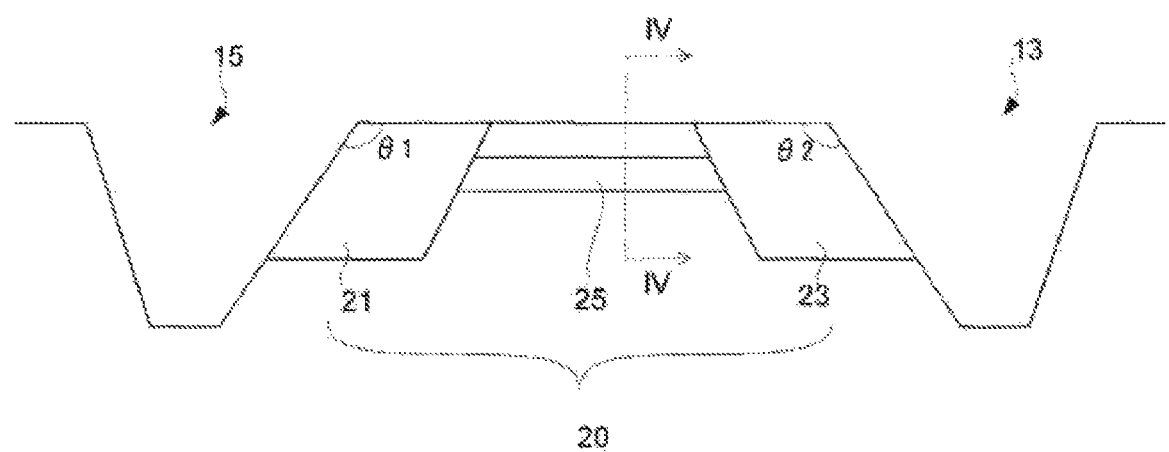
FIG. 3 is a cross-sectional view taken along the line of FIG. 2.

The lug groove 21 extends from the groove wall on the vehicle outer side of the outer circumferential main groove 15 toward the vehicle outer side. It is preferable that the lug groove 21 extends toward the vehicle outer side from a location where an angle θ1 (see FIG. 3) formed by the groove wall on the vehicle outer side of the outer circumferential main groove 15 and the contact surface is greater than the average of the maximum value and the minimum value of the angle θ1. In particular, it is preferable that the lug groove 21 extends toward the vehicle outer side from a location where the angle θ1 is at its maximum. That is, as illustrated in FIG. 2, it is preferable that the lug groove 21 extends toward the vehicle outer side from a location where the interval between the edge 15B and the valley line 15D becomes the widest in the tire lateral direction. Here, the angle formed by the groove wall and the contact surface is, as illustrated in FIG. 3, the angle between the groove wall in a cross section of the tire radial direction and the plane in contact with the contact surface at the edge. It should be noted that FIG. 3 illustrates an example in which the angle θ1 formed by the groove wall on the vehicle outer side of the outer circumferential main groove 15 and the contact surface is at its maximum. In addition, according to one embodiment, in the case that the amplitudes of the wave-like shapes of the outer circumferential main groove 15 and the outer circumferential main groove 17 are equal, the minimum value of the angle θ1 is equal to the angle θ4 in FIG. 5.

The lug groove 23 extends from the groove wall on the vehicle inner side of the inner circumferential main groove 13 toward the vehicle inner side. It is preferable that the lug groove 23 extends toward the vehicle inner side from a location where an angle $\theta 2$ (see FIG. 3) formed by the groove wall on the vehicle inner side of the inner circumferential main groove 13 and the contact surface is greater than the average of the maximum value and the minimum value of the angle $\theta 2$. In particular, it is preferable that the lug groove 23 extends toward the vehicle inner side from a location where the angle $\theta 2$ is at its maximum. That is, as illustrated in FIG. 2, it is preferable that the lug groove 23 extends toward the vehicle inner side from a location where the interval between the edge 13A and the valley line 13C becomes the widest in the tire lateral direction. It should be noted that FIG. 3 illustrates an example in which the angle $\theta 2$ formed by the groove wall on the vehicle inner side of the inner circumferential main groove 13 and the contact surface is at its maximum. In addition, according to one embodiment, the minimum value of the angle $\theta 2$ is equal to the angle $\theta 3$ in FIG. 5.

When the length of the lug groove 21 is denoted as LA and the length of the lug groove 23 is denoted as LB, it is preferable that LA>LB. More preferably, LA is approximately twice LB, and $1.9 \leq LA/LB \leq 2.1$. When $1.9 \leq LA/LB$, the wet performance can be sufficiently achieved. In contrast, when $LA/LB \leq 2.1$, wear resistance can be improved.

FIG. 3 is a cross-sectional view taken along the line of FIG. 2. As illustrated in FIG. 3, the sipe 25 is provided between the end portion of the lug groove 21 on the vehicle outer side and the end portion of the lug groove 23 on the vehicle inner side, and connects the lug groove 21 and the lug groove 23. It should be noted that the lug groove 21 is shallower than the outer circumferential main groove 15, and the sipe 25 is shallower than the lug groove 21. In addition, the lug groove 23 is shallower than the inner circumferential main groove 13, and the sipe 25 is shallower than the lug groove 23.

Figure 4:
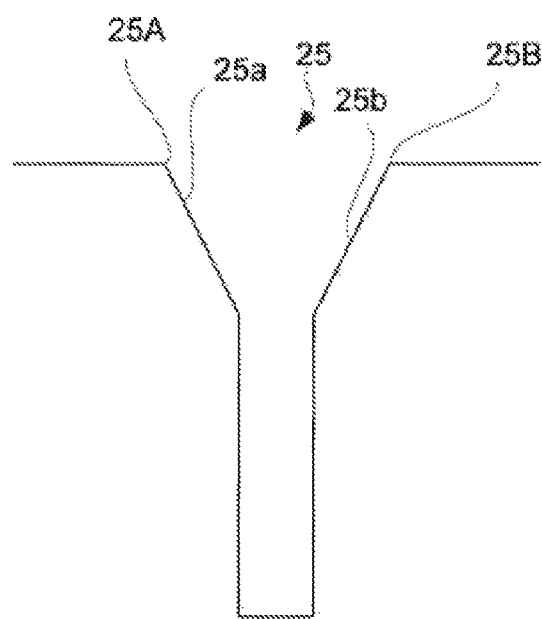
FIG. 4 is a cross-sectional view taken along the line IV-IV of FIG. 3.

FIG. 4 is a cross-sectional view taken along the line IV-IV of FIG. 3. As illustrated in FIG. 4, in the sipe 25, chamfering is performed at portions connecting the pair of sipe walls of the sipe 25 with the contact surface, and inclined surfaces 25a and 25b are formed in which the interval between the sipe walls expands toward the contact surface. In this way, by chamfering the sipe 25, water can flow between the lug groove 21 and the lug groove 23 through a gap enclosed by the road surface and the inclined surfaces 25a and 25b in a state where the contact surface is in contact with the road surface. For this reason, water can be drained from between the inner circumferential main groove 13 and the outer circumferential main groove 15.

The length of the sipe 25 is preferably from 53% to 58% of the lug groove/sipe assembly 20. If the length of the sipe 25 is less than 53%, the effect of the drainage performance due to the chamfered sipe 25 cannot be sufficiently achieved. In contrast, if the length of the sipe 25 exceeds 58%, the rigidity of the land portion between the inner circumferential main groove 13 and the outer circumferential main groove 15 cannot be maintained within an appropriate range.

The interval between the edge 25A of the inclined surface 25a and the contact surface and the edge 25B of the inclined surface 25b and the contact surface is preferably equal to the groove width of the lug groove 21 and the groove width of the lug groove 23. By aligning the interval between the edges 25A and 25B with the groove width of the lug groove 21 and the groove width of the lug groove 23, water can flow easily and drainage properties are improved.

In the connection portion between the lug grooves 21, 23 and the sipe 25, it is preferable that the center position (the center position in the width direction) between the sipe walls of the sipe 25 coincides with the center position of the lug grooves 21, 23 in the groove width direction. Accordingly, water flows more easily and water discharge performance is improved.

Preferably, the inclined surfaces 25a, 25b are provided between a location with a depth of from 0.5 to 3.0 mm from the contact surface of the groove wall of the sipe 25 and the contact surface. Since the inclined surfaces 25a and 25b are provided at a depth of greater than or equal to 0.5 mm, the drainage properties can be enhanced while sufficiently increasing the ground contact pressure, and the wet performance can be improved. In contrast, by providing the inclined surfaces 25a and 25b in a range of less than or equal to 3.0 mm from the contact surface, the rigidity of the land portion between the inner circumferential main groove 13 and the outer circumferential main groove 15 is secured, and the wet performance can be improved.

As a result of the lug groove 21 extending toward the vehicle outer side from a location where an angle formed by the groove wall on the vehicle outer side of the outer circumferential main groove 15 and the contact surface is maximum and the lug groove 23 extending toward the vehicle inner side from a location where an angle formed by the groove wall on the vehicle inner side of the inner circumferential main groove 13 and the contact surface is maximum, the drainage performance of the inner circumferential main groove 13 and the outer circumferential main groove 15 can be enhanced. That is, at the location described above, since the inclination of the groove wall with respect to the groove bottom is gentle, the groove cross-sectional area of the inner circumferential main groove 13 and the outer circumferential main groove 15 is minimized at this portion, and the drainage performance along the groove wall decreases, by providing a lug groove in this portion, drainage from the circumferential main groove to the lug groove can be promoted. In particular, by improving the drainage performance on the vehicle inner side, wet performance, such as wet handling performance, can be enhanced.

The plurality of lug groove/sipe assemblies 30 are provided so as to connect the groove wall on the vehicle outer side of the inner circumferential main groove 13 and the groove wall on the vehicle inner side of the outer circumferential main groove 17. Each of the lug groove/sipe assemblies 30 is provided with lug grooves 31 (the second inner lug groove) at both ends, a lug groove 33 (the second outer lug groove), and a sipe 35 (the second sipe) at the central portion.

Figure 5:
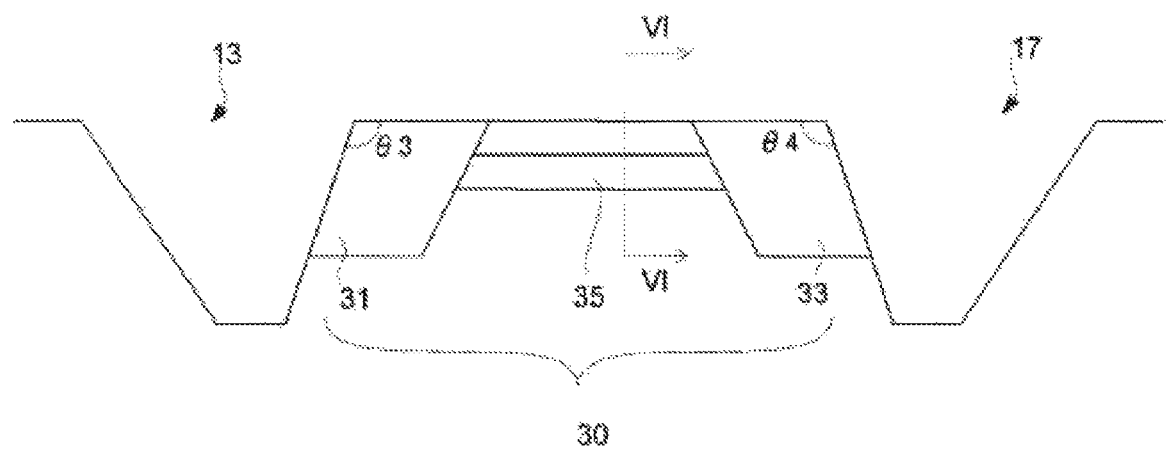
FIG. 5 is a cross-sectional view taken along the line V-V of FIG. 2.

The lug groove 31 extends from the groove wall on the vehicle outer side of the inner circumferential main groove 13 toward the vehicle outer side. It is preferable that the lug groove 31 extends toward the vehicle inner side from a location where an angle $\theta 3$ (see FIG. 5) formed by the groove wall on the vehicle outer side of the inner circumferential main groove 13 and the contact surface is smaller than the average of the maximum value and the minimum value of the angle $\theta 3$. In particular, it is preferable that the lug groove 31 extends toward the vehicle inner side from a location where the angle $\theta 3$ is at its minimum. That is, as illustrated in FIG. 2, it is preferable that the lug groove 31 extends toward the vehicle outer side from a location where the interval between the edge 13B and the valley line 13D becomes the narrowest in the tire lateral direction. It should be noted that FIG. 5 illustrates an example in which the angle $\theta 3$ formed by the groove wall on the vehicle outer side of the inner circumferential main groove 13 and the contact surface is at its minimum value. In addition, according to one embodiment, the maximum value of the angle $\theta 3$ is equal to the angle $\theta 2$ illustrated in FIG. 3.

The lug groove 33 extends from the groove wall on the vehicle inner side of the outer circumferential main groove 17 toward the vehicle inner side. It is preferable that the lug groove 33 extends toward the vehicle inner side from a location where an angle θ4 (see FIG. 5) formed by the groove wall on the vehicle inner side of the outer circumferential main groove 17 and the contact surface is smaller than the average of the maximum value and the minimum value of the angle θ4. In particular, it is preferable that the lug groove 33 extends toward the vehicle inner side from a location where the angle θ4 is at its minimum. That is, as illustrated in FIG. 2, it is preferable that the lug groove 33 extends toward the vehicle inner side from a location where the interval between the edge 17A and the valley line 17C becomes the narrowest in the tire lateral direction. It should be noted that FIG. 5 illustrates an example in which the angle θ4 formed by the groove wall on the vehicle inner side of the outer circumferential main groove 17 and the contact surface is the angle of the minimum value. In addition, according to one embodiment, in the case that the amplitudes of the wave-like shapes of the outer circumferential main groove 15 and the outer circumferential main groove 17 are equal, the maximum value of θ4 is equal to θ1 illustrated in FIG. 3.

When the length of the lug groove 31 is denoted as LC and the length of the lug groove 33 is denoted as LD, it is preferable that LC>LD. More preferably, 1.03≤LC/LD≤1.2. When 1.03≤LC/LD, the wet performance can be sufficiently achieved. In contrast, when LC/LD≤1.2, wear resistance can be improved.

FIG. 5 is a cross-sectional view taken along the line V-V of FIG. 2. As illustrated in FIG. 5, the sipe 35 is provided between the end portion of the lug groove 31 on the vehicle inner side and the end portion of the lug groove 33 on the vehicle outer side, and connects the lug groove 31 and the lug groove 33. It should be noted that the lug groove 31 is shallower than the inner circumferential main groove 13, and the sipe 35 is shallower than the lug groove 31. In addition, the lug groove 33 is shallower than the outer circumferential main groove 17, and the sipe 35 is shallower than the lug groove 33.

Figure 6:
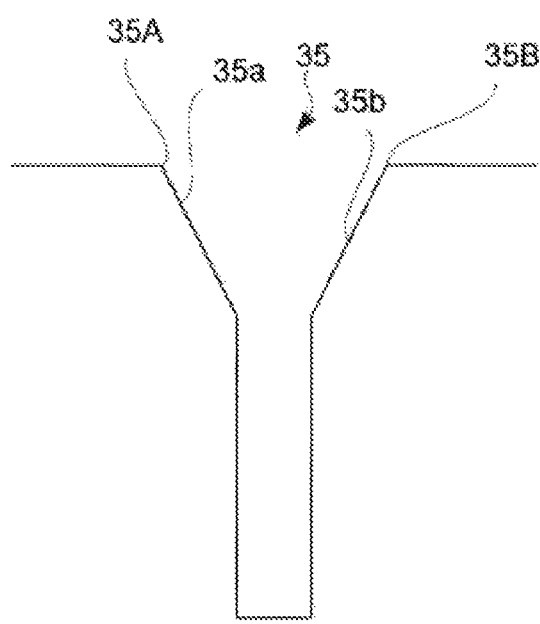
FIG. 6 is a cross-sectional view taken along the line VI-VI of FIG. 5.

FIG. 6 is a cross-sectional view taken along the line VI-VI of FIG. 5. As illustrated in FIG. 6, in the sipe 35, chamfering is performed at portions connecting the pair of sipe walls of the sipe 35 with the contact surface, and inclined surfaces 35a and 35b are formed in which the interval between the sipe walls expands toward the contact surface. In this way, by chamfering the sipe 35, water can flow between the lug groove 31 and the lug groove 33 through a gap enclosed by the road surface and the inclined surfaces 35a and 35b in a state where the contact surface is in contact with the road surface. For this reason, water can be drained from between the inner circumferential main groove 13 and the outer circumferential main groove 17.

The length of the sipe 35 is preferably from 48% to 53% of the lug groove/sipe assembly 30. If the length of the sipe 35 is less than 48%, the effect of the drainage performance due to the chamfered sipe 35 cannot be sufficiently achieved. In contrast, if the length of the sipe 35 exceeds 53%, the rigidity of the land portion between the inner circumferential main groove 13 and the outer circumferential main groove 17 cannot be maintained within an appropriate range.

The interval between the edge 35A of the inclined surface 35a and the contact surface and the edge 35B of the inclined surface 35b and the contact surface is preferably equal to the groove width of the lug groove 31 and the groove width of the lug groove 33. By aligning the interval between the edges 35A and 35B with the groove width of the lug groove 31 and the groove width of the lug groove 33, water can flow easily and drainage properties are improved.

In the connection portion between the lug grooves 31, 33 and the sipe 35, it is preferable that the center position between the sipe walls of the sipe 35 coincides with the center position of the lug grooves 31, 33 in the groove width direction. Accordingly, water flows more easily and water discharge performance is improved.

Preferably, the inclined surfaces 35a, 35b are provided at a location where the depth from the contact surface of the groove wall of the sipe 35 is from 0.5 to 3.0 mm. Since the inclined surfaces 35a and 35b are provided at a depth of greater than or equal to 0.5 mm, the drainage properties can be enhanced while sufficiently increasing the ground contact pressure, and the wet performance can be improved. In contrast, by providing the inclined surfaces 35a and 35b in a range of less than or equal to 3.0 mm from the contact surface, the rigidity of the land portion between the inner circumferential main groove 13 and the outer circumferential main groove 17 is secured, and the wet performance can be improved.

As a result of the lug groove 31 extending toward the vehicle outer side from a location where an angle formed by the groove wall on the vehicle outer side of the inner circumferential main groove 13 and the contact surface is minimum and the lug groove 33 extending toward the vehicle inner side from a location where an angle formed by the groove wall on the vehicle inner side of the outer circumferential main groove 17 and the contact surface is minimum, the rigidity of the land portion enclosed by the inner circumferential main groove 13, the outer circumferential main groove 17, and the lug groove/sipe assembly 30 can be increased. That is, in the portion along the groove wall of the land portion between the inner circumferential main groove 13 and the outer circumferential main groove 17, the rigidity of the land portion becomes greater as the angle between the groove wall and the contact surface becomes larger, and the rigidity becomes lower as the angle between the groove wall and the contact surface becomes smaller. Since a connection portion of the lug groove/sipe assembly 30 is provided at portions where the angle between the groove wall and the contact surface is smaller, and a connection portion for the lug groove/sipe assembly 30 is not provided in portions where the angle between the groove wall and the contact surface is large, a portion having a large angle formed by the groove wall and the contact surface and that has high rigidity can be made to be a land portion without a lug groove. In particular, since the rigidity of the land portion can be increased on the vehicle outer side, which is prone to uneven wear, it is preferable to provide a connection portion of the lug groove/sipe assembly 30 in portions where the angle formed by the groove wall and the contact surface is smaller.

It should be noted that, as illustrated in FIG. 2, a shoulder lug groove 41 may be provided further on the vehicle inner side than the outer circumferential main groove 15. It is preferable that the shoulder lug groove 41 does not communicate with the outer circumferential main groove 15.

In addition, as illustrated in FIG. 2, a shoulder lug groove 43 may be provided further on the vehicle outer side than the outer circumferential main groove 17. It is preferable that the shoulder lug groove 43 does not communicate with the outer circumferential main groove 17. In this way, the air flow from the outer circumferential main groove 15 to the shoulder lug groove 41 and the air flow from the outer circumferential main groove 17 to the shoulder lug groove 43 can be prevented, and noise performance can be improved.

EXAMPLES

In order to investigate the effects of the tread pattern 10 of the tire 1 of the present embodiment, a tire was prototyped.

The tire size was 195/65R15. A tire with a rim size of 15×6.0 J and having a tread pattern according to the specifications described in the following tables 1A and 1B was manufactured. An FF vehicle with an engine displacement of 2 liters was used as a vehicle for studying tire performance. The internal pressure condition of all of the front wheels and the rear wheels was set to 230 kPa. The wavelength and amplitude of the wave-like shapes of the inner circumferential main groove and the two outer circumferential main grooves are the same, and their phases were aligned.

Although inner lug grooves corresponding to the lug groove 23 and the lug groove 31 are provided in Comparative Example 1, the inner lug grooves and the outer circumferential main grooves were connected via the sipe without providing outer lug grooves corresponding to the lug grooves 21 and the lug grooves 33. A chamfered surface is provided on the sipe. Although inner lug grooves and outer lug grooves were provided in Comparative Example 2, no chamfered surface was provided on the sipe connecting the inner lug groove and the outer lug groove.

In Examples 1 to 10, in addition to providing the inner lug grooves (the lug groove 23 and the lug groove 31) and the outer lug grooves (the lug groove 21 and the lug groove 33), a chamfered surface was provided on the sipe connecting the inner lug grooves and the outer lug grooves. The magnitude (greater than or smaller than the average) with respect to the average of $\theta1$ and $\theta2$, the magnitude (greater than or smaller than the average) with respect to the average of $\theta3$ and $\theta4$, LA/LB, and LC/LD are illustrated in Table 1A and Table 1B.

It should be noted that in Comparative Example 1 and Examples 1 to 10, the distance between the pair of edges formed by the chamfered surface (the inclined surface) of the sipe and the contact surface is equal to the groove width of the lug groove.

As the tire performance of the prototype tire, the wet performance and wear resistance performance were evaluated as follows.

With regard to the wet performance, the braking distance was measured at 100 km/h at an outdoor tire testing facility having a wet road surface with a water depth of 1 mm. The reciprocal of the measurement value of the tire of Comparative Example 1 was taken to be 100, and the wet performance was evaluated by indexing the reciprocals of the measurement values of other examples. Larger index values indicate superior wet performance.

With regard to the wear resistance performance, the distance traveled until the wear indicator provided in the circumferential main groove was exposed was measured. The travel distance of the tire in Comparative Example 1 was taken to be 100, and the travel distance of the other examples was indexed to evaluate the wear resistance performance. Larger index values indicate superior wear resistance performance.

The evaluation results are shown in Table 1A and Table 1B.

TABLE 1A-1

|  | Comparative Example 1 | Comparative Example 2 | Example 1 | Example 2 |
|---|---|---|---|---|
| Presence/absence of inner lug groove | Yes | Yes | Yes | Yes |
| Presence/absence of outer lug groove | No | Yes | Yes | Yes |
| Sipe chamfer | Yes | No | Yes | Yes |
| Magnitude with respect to the average of $\theta1$, $\theta2$ | Small | Small | Small | Large |
| Magnitude with respect to the average of $\theta3$, $\theta4$ | — | Small | Small | Large |
| LA/LB | — | 1.6 | 1.6 | 1.6 |
| LC/LD | — | 1.0 | 1.0 | 1.0 |
| Wet performance | 100 | 98 | 104 | 106 |
| Wear resistance performance | 100 | 102 | 104 | 104 |

TABLE 1A-2

|  | Example 3 | Example 4 | Example 5 | Example 6 | Example 7 |
|---|---|---|---|---|---|
| Presence/absence of inner lug groove | Yes | Yes | Yes | Yes | Yes |
| Presence/absence of outer lug groove | Yes | Yes | Yes | Yes | Yes |
| Sipe chamfer | Yes | Yes | Yes | Yes | Yes |
| Magnitude with respect to the average of $\theta1$, $\theta2$ | Large | Large | Large | Large | Large |
| Magnitude with respect to the average of $\theta3$, $\theta4$ | Small | Small | Small | Small | Small |
| LA/LB | 1.6 | 1.8 | 2.0 | 2.2 | 2.4 |
| LC/LD | 1.0 | 1.0 | 1.0 | 1.0 | 1.0 |
| Wet performance | 106 | 108 | 108 | 108 | 108 |
| Wear resistance performance | 108 | 108 | 108 | 108 | 106 |

TABLE 1B

|  | Example 8 | Example 9 | Example 10 |
|---|---|---|---|
| Presence/absence of inner lug groove | Yes | Yes | Yes |
| Presence/absence of outer lug groove | Yes | Yes | Yes |
| Sipe chamfer | Yes | Yes | Yes |
| Magnitude with respect to the average of $\theta1$, $\theta2$ | Large | Large | Large |
| Magnitude with respect to the average of $\theta3$, $\theta4$ | Small | Small | Small |
| LA/LB | 2.0 | 2.0 | 2.0 |
| LC/LD | 1.1 | 1.2 | 1.3 |
| Wet performance | 110 | 110 | 110 |
| Wear resistance performance | 108 | 108 | 106 |

When Comparative Example 1, Comparative Example 2, and Example 1 are compared, it is understood that by providing the inner lug grooves and the outer lug grooves and by providing the a chamfered surface on the sipe connecting the inner lug grooves and the outer lug grooves, wet performance improves and the wear resistance performance increases.

When Example 1 and Example 2 are compared, it is understood that by providing the inner lug groove and the outer lug groove on the vehicle inner side at a location where the angle θ1 and the angle θ2 are greater than the average of the angle θ1 and the angle θ2, the wet performance increases.

In addition, when Example 2 and Example 3 are compared, it is understood that by providing the inner lug groove and the outer lug groove on the vehicle outer side at a location where the angle θ3 and the angle θ4 are smaller than the average of the angle θ3 and the angle θ4, the wear resistance performance increases.

When Examples 3 to 7 are compared, it is understood that by making LA/LB greater than or equal to 1.8, the wet performance is excellent. In contrast, it is understood that by making LA/LB less than or equal to 2.2, the wear resistance performance is excellent.

When Examples 5 and 8 to 10 are compared, it is understood that by making LC/LD greater than or equal to 1.1, the wet performance is excellent. In contrast, it is understood that by making LC/LD less than or equal to 1.2, the wear resistance performance is excellent.

Although the foregoing has been a detailed description of the pneumatic tire according to the present embodiment, the present technology is not limited to the above embodiments, and various improvements or modifications may be made within the scope of the present technology.

Although the tread pattern of the embodiment described above includes the inner circumferential main groove 13, the outer circumferential main groove 15, the outer circumferential main groove 17, and the sipe assemblies 20, 30 in both half-tread regions 11a, 11b as illustrated in FIG. 2, the tread pattern of one embodiment may be a tread pattern that includes one of either the outer circumferential main groove 15 or the outer circumferential main groove 17 and one of either of the sipe assemblies 20 or 30 in one of the half-tread regions. Since the sipe assemblies 20, 30 include sipes having a chamfered inclined surface, the sipe assemblies 20, 30 have a drainage function, and can achieve an edge effect as sipes. Further, since the rigidity of the land portions provided in the sipe assemblies 20, 30 is higher than the rigidity of the land portions provided in the sipes without chamfering, uneven wear can be suppressed.

At this time, in a new tire, from the viewpoint of improving the drainage properties, it is preferable for the distance between the pair of ridge lines formed by the chamfered surface of the sipe and the contact surface of the tread portion to be equal to the groove width of the inner lug groove and the groove width of the outer lug groove. In addition, from the viewpoint of improving the drainage properties, the center position in the sipe width direction preferably coincides with the center position in the groove width direction of the inner lug groove and the outer lug groove in the connection portion between the sipe and the inner lug groove and the outer lug groove.

In addition, in the case of a configuration in which the inner lug groove extends from a location where an angle formed by a groove wall on an outer circumferential main groove side of the inner circumferential main groove and the contact surface is greater than an average value of a maximum value and a minimum value of an angle formed by a groove wall on an outer circumferential main groove side of the inner circumferential main groove and the contact surface; and the outer lug groove extends from a location where an angle formed by a groove wall on an inner circumferential main groove side of the outer circumferential main groove and the contact surface is greater than an average value of a maximum value and a minimum value of an angle formed by a groove wall on an inner circumferential main groove side of the outer circumferential main groove and the contact surface, since drainage from the inner circumferential main groove or the outer circumferential main groove to the outer lug grooves or the inner lug grooves can be promoted, the wet performance can be increased.

In addition, in the case of a configuration in which the inner lug groove extends from a location where an angle formed by a groove wall on an outer circumferential main groove side of the inner circumferential main groove and the contact surface is smaller than an average value of a maximum value and a minimum value of an angle formed by a groove wall on an outer circumferential main groove side of the inner circumferential main groove and the contact surface; and the outer lug groove extends from a location where an angle formed by a groove wall on an inner circumferential main groove side of the outer circumferential main groove and the contact surface is smaller than an average value of a maximum value and a minimum value of an angle formed by a groove wall on an inner circumferential main groove side of the outer circumferential main groove and the contact surface, since the connection portion between the inner lug groove and the outer lug groove is not provided at a location with high rigidity that is greater than the average value of the maximum value and the minimum value of the angle formed by the groove wall on the inner circumferential main groove side of the outer circumferential main groove and the contact surface, the decrease in rigidity of the land portion can be suppressed, and wear can also be suppressed.

The invention claimed is:

1. A pneumatic tire having a tread pattern and a predetermined mounting direction in a vehicle inner-outer side, the pneumatic tire comprising:
    an inner circumferential main groove having groove walls each extending in a tire circumferential direction while angles of the groove walls with respect to a contact surface vary with a predetermined amplitude;
    an outer circumferential main groove located away from the inner circumferential main groove toward a vehicle inner side, the outer circumferential main groove having groove walls each extending in a tire circumferential direction while angles of the groove wall with respect to the contact surface vary with a predetermined amplitude;
    an inner lug groove extending, from the inner circumferential main groove toward the outer circumferential main groove, partway along a region of the land portion between the inner circumferential main groove and the outer circumferential main groove;
    an outer lug groove extending, from the outer circumferential main groove toward the inner circumferential main groove, partway along a region of a land portion between the inner circumferential main groove and the outer circumferential main groove; and
    a sipe configured to communicate an end portion of an outer circumferential main groove side of the inner lug groove with an end portion of an inner circumferential main groove side of the outer lug groove; wherein a width of the sipe expands toward a tread surface due to a pair of chamfered surfaces provided on walls of the sipe along an extension direction of the sipe on the contact surface;
    the inner lug groove extends from a location where an angle formed by a groove wall on the outer circumferential main groove side of the inner circumferential main groove and the contact surface is greater than an average value of a maximum value and a minimum value of the angle formed by the groove wall on the outer circumferential main groove side of the inner circumferential main groove and the contact surface; and the outer lug groove extends from a location where the angle formed by a groove wall on the inner circumferential main groove side of the outer circumferential main groove and the contact surface is greater than an average value of a maximum value and a minimum value of the angle formed by the groove wall on an inner circumferential main groove side of the outer circumferential main groove and the contact surface.

2. The pneumatic tire according to either claim 1, wherein a center position in a width direction of the sipe coincides with a center position in a groove width direction of the inner lug groove and the outer lug groove, at a connection portion of the sipe with the inner lug groove and the outer lug groove.

3. The pneumatic tire according to claim 1, wherein:
a length of the inner lug groove and a length of the outer lug groove are different from each other.

4. The pneumatic tire according to claim 1, wherein:
the length of one of the inner lug groove is longer than the length of the outer lug groove.

5. The pneumatic tire according to claim 4, wherein:
when the length of the outer lug groove is denoted as LA and the length of the inner lug groove is denoted as LB, then $1.8 \leq LA/LB \leq 2.2$.

6. The pneumatic tire according to claim 4, wherein:
when the length of the inner groove is denoted as LC and the length of the outer groove is denoted as LD, then $1.0 \leq LC/LD \leq 1.2$.

7. The pneumatic tire according to claim 1, wherein an interval between a pair of ridge lines formed by the chamfered surfaces and the contact surface is equal to a groove width of the inner lug groove and a groove width of the outer lug groove.

8. The pneumatic tire according to either claim 7, wherein a center position in a width direction of the sipe coincides with a center position in a groove width direction of the inner lug groove and the outer lug groove, at a connection portion of the sipe with the inner lug groove and the outer lug groove.

9. A pneumatic tire having a tread pattern and a predetermined mounting direction in a vehicle inner-outer side, the pneumatic tire comprising:
an inner circumferential main groove having groove walls each extending in a tire circumferential direction while angles of the groove walls with respect to a contact surface vary with a predetermined amplitude;
a first outer circumferential main groove located away from the inner circumferential main groove toward a vehicle inner side, the first outer circumferential main groove having groove walls each extending in a tire circumferential direction while angles of the groove walls with respect to the contact surface vary with a predetermined amplitude;
a first inner lug groove extending, from the inner circumferential main groove toward the first outer circumferential main groove, partway along a region of a land portion between the inner circumferential main groove and the first outer circumferential main groove;
a first outer lug groove extending, from the first outer circumferential main groove toward the inner circumferential main groove, partway along a region of the land portion between the inner circumferential main groove and the first outer circumferential main groove;

a first sipe configured to communicate an end portion of a first outer circumferential main groove side of the first inner lug groove with an end portion of an inner circumferential main groove side of the first outer lug groove;

a second outer circumferential main groove located away from the inner circumferential main groove toward a vehicle outer side, the second outer circumferential main groove having groove walls each extending in a tire circumferential direction while angles of the groove walls with respect to the contact surface vary with a predetermined amplitude;

a second inner lug groove extending, from the inner circumferential main groove toward the second outer circumferential main groove, partway along a region of the land portion between the inner circumferential main groove and the second outer circumferential main groove;

a second outer lug groove extending, from the second outer circumferential main groove toward the inner circumferential main groove, partway along a region of a land portion between the inner circumferential main groove and the second outer circumferential main groove; and a second sipe configured to communicate an end portion of a second outer circumferential main groove side of the second inner lug groove with an end portion of an inner circumferential main groove side of the second outer lug groove;

wherein a width of the first sipe expands toward a tread surface due to a pair of first chamfered surfaces provided on walls of the first sipe along an extension direction of the first sipe on the contact surface;

a width of the second sipe expands toward the tread surface due to a pair of second chamfered surfaces provided on walls of the second sipe along an extension direction of the second sipe on the contact surface;

the first inner lug groove extends from a location where an angle formed by a groove wall on the vehicle inner side of the inner circumferential main groove and the contact surface is greater than an average value of a maximum value and a minimum value of the angle formed by the groove wall on the vehicle inner side of the inner circumferential main groove and the contact surface; and the first outer lug groove extends from a location where an angle formed by a groove wall on the vehicle outer side of the first outer circumferential main groove and the contact surface is greater than an average value of a maximum value and a minimum value of the angle formed by the groove wall on the vehicle outer side of the first outer circumferential main groove and the contact surface.

10. The pneumatic tire according to claim 9, wherein:
when the length of the first outer lug groove is denoted as LA and the length of the first inner lug groove is denoted as LB, then $1.8 \leq LA/LB \leq 2.2$.

11. The pneumatic tire according to claim 9, wherein:
when the length of the second inner lug groove is denoted as LC and the length of the second outer lug groove is denoted as LD, then $1.0 \leq LC/LD \leq 1.2$.

12. The pneumatic tire according to claim 9, wherein:
an interval between a pair of ridge lines formed by the first chamfered surfaces and the contact surface is equal to a groove width of the first inner lug groove and a groove width of the first outer lug groove.

13. The pneumatic tire according to claim 9, wherein:
an interval between a pair of ridge lines formed by the second chamfered surfaces and the contact surface is equal to a groove width of the second inner lug groove and a groove width of the second outer lug groove.

14. The pneumatic tire according to claim 9, wherein:
the second inner lug groove extends from a location where an angle formed by a groove wall on a second outer circumferential main groove side of the inner circumferential main groove and the contact surface is smaller than an average value of a maximum value and a minimum value of an angle formed by a groove wall on a second outer circumferential main groove side of the inner circumferential main groove and the contact surface; and
the second outer lug groove extends from a location where an angle formed by a groove wall on an inner circumferential main groove side of the second outer circumferential main groove and the contact surface is smaller than an average value of a maximum value and a minimum value of an angle formed by a groove wall on an inner circumferential main groove side of the second outer circumferential main groove and the contact surface.

15. The pneumatic tire according to claim 9, wherein: a length of the first inner lug groove and a length of the first outer lug groove, or a length of the second inner lug groove and a length the second outer lug groove, are different from each other.

16. The pneumatic tire according to claim 15, wherein:
the length of the first outer lug groove is longer than the length of the first inner lug groove.

17. The pneumatic tire according to claim 15, wherein:
the length of the second outer lug groove is longer than the length of the second inner lug groove.

18. A pneumatic tire having a tread pattern and a predetermined mounting direction in a vehicle inner-outer side, the pneumatic tire comprising:
an inner circumferential main groove having groove walls each extending in a tire circumferential direction while angles of the groove walls with respect to a contact surface vary with a predetermined amplitude;
an outer circumferential main groove located away from the inner circumferential main groove toward a vehicle outer side, the outer circumferential main groove having groove walls each extending in a tire circumferential direction while angles of the groove wall with respect to the contact surface vary with a predetermined amplitude;
an inner lug groove extending, from the inner circumferential main groove toward the outer circumferential main groove, partway along a region of a land portion between the inner circumferential main groove and the outer circumferential main groove;
an outer lug groove extending, from the outer circumferential main groove toward the inner circumferential main groove, partway along a region of the land portion between the inner circumferential main groove and the outer circumferential main groove; and
a sipe configured to communicate an end portion of an outer circumferential main groove side of the inner lug groove with an end portion of an inner circumferential main groove side of the outer lug groove, wherein
a width of the sipe expands toward a tread surface due to a pair of chamfered surfaces provided on walls of the sipe along an extension direction of the sipe on the contact surface;

wherein:
the inner lug groove extends from a location where an angle formed by a groove wall on the outer circumferential main groove side of the inner circumferential main groove and the contact surface is smaller than an average value of a maximum value and a minimum value of the angle formed by the groove wall on the outer circumferential main groove side of the inner circumferential main groove and the contact surface; and
the outer lug groove extends from a location where an angle formed by a groove wall on the inner circumferential main groove side of the outer circumferential main groove and the contact surface is smaller than an average value of a maximum value and a minimum value of the angle formed by the groove wall on the inner circumferential main groove side of the outer circumferential main groove and the contact surface.

19. A pneumatic tire having a tread pattern and a predetermined mounting direction in a vehicle inner-outer side, the pneumatic tire comprising:
an inner circumferential main groove having groove walls each extending in a tire circumferential direction while angles of the groove walls with respect to a contact surface vary with a predetermined amplitude;
a first outer circumferential main groove located away from the inner circumferential main groove toward a vehicle inner side, the first outer circumferential main groove having groove walls each extending in a tire circumferential direction while angles of the groove walls with respect to the contact surface vary with a predetermined amplitude;
a first inner lug groove extending, from the inner circumferential main groove toward the first outer circumferential main groove, partway along a region of a land portion between the inner circumferential main groove and the first outer circumferential main groove;
a first outer lug groove extending, from the first outer circumferential main groove toward the inner circumferential main groove, partway along a region of the land portion between the inner circumferential main groove and the first outer circumferential main groove;
a first sipe configured to communicate an end portion of a first outer circumferential main groove side of the first inner lug groove with an end portion of an inner circumferential main groove side of the first outer lug groove;
a second outer circumferential main groove located away from the inner circumferential main groove toward a vehicle outer side, the second outer circumferential main groove having groove walls each extending in a tire circumferential direction while angles of the groove walls with respect to the contact surface vary with a predetermined amplitude;
a second inner lug groove extending, from the inner circumferential main groove toward the second outer circumferential main groove, partway along a region of a land portion between the inner circumferential main groove and the second outer circumferential main groove;
a second outer lug groove extending, from the second outer circumferential main groove toward the inner circumferential main groove, partway along a region of the land portion between the inner circumferential main groove and the second outer circumferential main groove; and a second sipe configured to communicate an end portion of a second outer circumferential main groove side of the second inner lug groove with an end portion of an inner circumferential main groove side of the second outer lug groove; wherein:

a width of the first sipe expands toward a tread surface due to a pair of first chamfered surfaces provided on walls of the first sipe along an extension direction of the first sipe on the contact surface, a width of the second sipe expands toward the tread surface due to a pair of second chamfered surfaces provided on walls of the second sipe along an extension direction of the second sipe on the contact surface, the second inner lug groove extends from a location where an angle formed by a groove wall on the vehicle outer side of the inner circumferential main groove and the contact surface is smaller than an average value of a maximum value and a minimum value of the angle formed by the groove wall on the vehicle outer side of the inner circumferential main groove and the contact surface; and the second outer lug groove extends from a location where an angle formed by a groove wall on the vehicle inner side of the second outer circumferential main groove and the contact surface is smaller than an average value of a maximum value and a minimum value of the angle formed by the groove wall on the vehicle inner side of the second outer circumferential main groove and the contact surface.

* * * * *